UNITED STATES PATENT OFFICE.

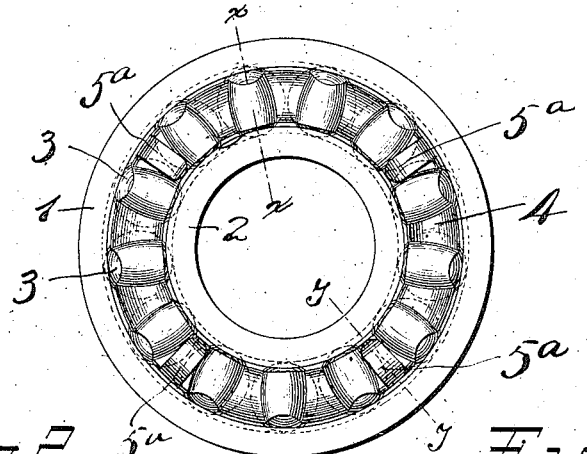
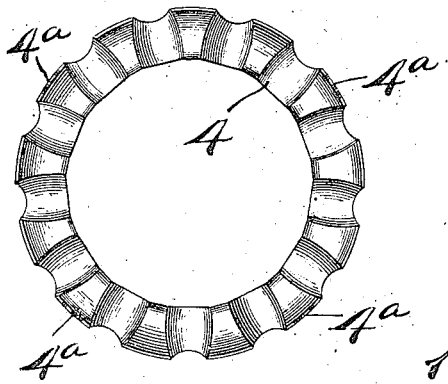
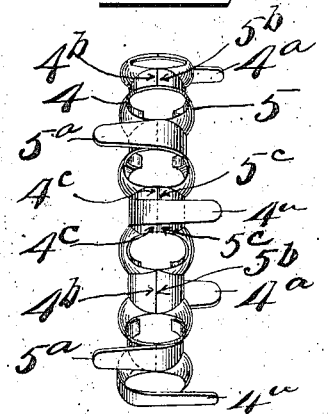
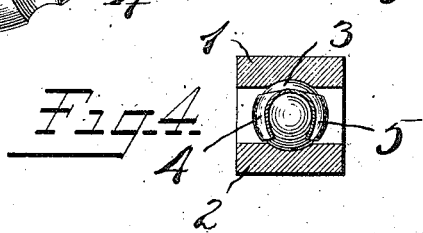
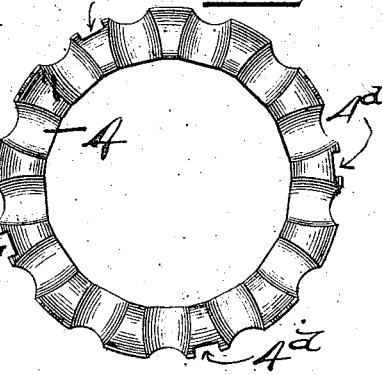
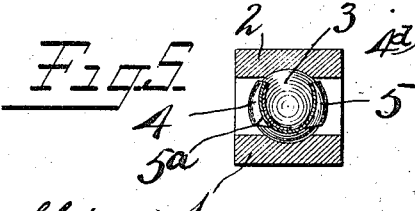

EDWARD C. GOODWIN AND EDWARD D. HOUSE, OF NEW BRITAIN, CONNECTICUT, ASSIGNORS TO THE HART & COOLEY COMPANY, OF NEW BRITAIN, CONNECTICUT, A CORPORATION OF CONNECTICUT.

BALL-CAGE.

981,551.

Specification of Letters Patent. Patented Jan. 10, 1911.

Application filed November 5, 1910. Serial No. 590,808.

*To all whom it may concern:*

Be it known that we, EDWARD C. GOODWIN and EDWARD D. HOUSE, citizens of the United States, residing at New Britain, county of Hartford, State of Connecticut, have invented certain new and useful Improvements in Ball-Cages, of which the following is a full, clear, and exact description.

Our invention relates to improvements in annular ball cages for ball bearings.

Figure 1 is a side elevation of a ball bearing complete, showing the cage in place. Fig. 2 is an inside view of one part of the ball cage before assembling. Fig. 3 is an edge elevation of the two parts of the ball cage placed together in the final position, but not as yet secured together. Fig. 4 is a cross section on the line $x-x$ of Fig. 1. Fig. 5 is a cross section on the line $y-y$ of Fig. 1. Fig. 6 illustrates a modification.

1 and 2 represent the two bearing rings of a ball bearing of ordinary construction, so well understood as to require no detailed description, it being sufficient to merely state that both rings, 1 and 2, are provided with the usual oppositely arranged ball raceway grooves in which are located balls 3—3.

Our improved cage is so constructed that a maximum number of balls may be provided and yet said cage will operate to effectively hold all of the balls slightly apart so that there will be no rubbing contact of one ball against another. The cage is made up of two ring-plates 4—5, preferably struck up from sheet-metal, both of said plates, preferably, being recessed to form shallow ball-receiving-pockets, as shown, said recesses so conforming to the balls that the walls of said recesses alone will prevent the balls, when the bearing is assembled, from moving toward and away from one another to any material extent.

$4^a$—$5^a$ are clenching-fingers formed on the outer edge of each of the plates and projecting laterally therefrom.

$4^b$—$5^b$ are what I will term spacer-fingers or extensions, also preferably formed on the outer edge of each of the plates 4 and 5 respectively, said spacer-fingers being of such length that when the two parts, 4—5, are placed together with the balls between them they will embrace the balls with the proper degree of snugness entirely around the bearing and thereby prevent any undue clamping of the plates upon the balls, whereby all of the balls will turn with a uniform degree of freedom. When the plates 4—5 have been assembled upon the balls, it will be noticed that the fingers, $4^a$—$5^a$ will alternately lap over the opposite plate from that on which said fingers are formed respectively, whereupon the overlapping ends of said fingers are curled down upon said plates to securely and permanently unite the two parts, 4—5, of the cage. In a bearing such as illustrated in the drawings, the balls would first be inserted between the rings, 1—2, after which the two parts, or ring-plates, of the cage would be applied and united.

It is obvious that any desired number of fingers may be formed upon each plate, but in practice, we have found that three or four on each plate was sufficient for the purposes described.

It will be noted that in striking up the plates 4—5 and in forming the ball-receiving-recesses therein, the metal of each plate is driven back, whereby, the spaces between the driven back portions may be utilized for the reception of the curled ends of the clamping fingers, the width of each finger being preferably such that the opposite side edges of said fingers will rest against the two adjacent struck-back portions of the plate embraced thereby so that there can be no slip of one ring-plate on the other. Should enough clamping-fingers be employed to occupy every space between the balls, an equivalent of the separate spacer-fingers $4^b$—$5^b$ could be employed by providing spacing-shoulders $4^c$—$5^c$ adjacent to the base of each finger $4^a$—$5^a$ (see Fig. 3), it being highly desirable to provide proper spacing means for the plates 4—5 in all instances. In the drawings we have shown a lesser number of clamping-fingers than the number of spaces between the balls, and in such instances, of course, such spaces could be occupied by the aforesaid spacer-fingers $4^b$—$5^b$. Variations of this sort are obviously contemplated as being within the scope of this invention. By forming the fingers on the outer side of each ring, fingers of greater width, and therefore greater strength, can be provided than by fingers formed at the inner edges of said plates. It should, therefore, be understood that this arrangement also is much to be preferred.

In Fig. 6 we have shown a slight modification in which 4 represents one of the side plates similar to the side plates 4—5 with the exception that in this case notches 4ᵈ are provided to receive the clamping tongues.

It is obvious that the ball receiving spaces in the plates 4—5 may be formed in a variety of ways, being preferred, however, that said recesses be formed by striking back the metal as shown. Said cups, or recesses, might, however, be formed by providing round perforations in the plates arranged to permit portions only of the balls to stand therein, such a modification being too obvious to require either further description or special modification.

What we claim is:

1. An annular ball cage, comprising, two ring plates having cupped recesses arranged to partially embrace balls, means formed integrally with one of said plates and arranged to engage and retain the other plate in coöperative relation thereto.

2. In an annular ball cage, two ring plates, both of said plates having oppositely arranged ball receiving recesses, each recess being arranged to partially embrace a ball, and a laterally extending finger formed on one plate arranged to partially encircle the other plate to hold both plates in coöperative relation.

3. In an annular ball cage, two ring plates having oppositely arranged recesses therein, each recess being arranged to partially embrace a ball, an integral ring engaging device on each plate, each of said devices engaging the opposite plate from that on which said device is formed to hold both of the plates in coöperative relation.

4. In an annular ball cage, two ring-like plates, both plates having ball receiving recesses therein, a plurality of fingers on the outer edge of each plate, the fingers on each plate being bent to engage the opposite plate whereby all of said fingers coöperate to hold said plates in operative relation to each other.

5. In an annular ball cage, two ring plates, one of said plates at least having ball receiving recesses therein, integrally formed and laterally offset spacer fingers at the outer edge of said ball cage to properly space said plates, and means to clamp said ring plates together in coöperative relation.

6. An annular ball cage, comprising, two ring plates having cupped recesses arranged to partially embrace balls, means formed integrally with one of said plates and arranged to engage and retain the other plate in coöperative relation thereto, and spacer means to hold said plates in the proper spaced relation.

EDWARD C. GOODWIN.
EDWARD D. HOUSE.

Witnesses:
W. E. DOANE,
J. D. POWERS.